United States Patent
Barker

[11] Patent Number: 5,873,223
[45] Date of Patent: Feb. 23, 1999

[54] GRASS CUTTING MACHINERY

[75] Inventor: Jamie Barker, Woodbridge, England

[73] Assignee: Ransomes, Sims & Jeffries Ltd., Ipswich, England

[21] Appl. No.: 633,437

[22] Filed: Apr. 17, 1996

[30] Foreign Application Priority Data

Apr. 25, 1995 [GB] United Kingdom ............ 9508372

[51] Int. Cl.$^6$ .............................................. A01D 34/62
[52] U.S. Cl. ........................ 56/1; 56/12.8; 56/17.3; 56/DIG. 23
[58] Field of Search ................ 56/12.8–2, 16.9, 56/12.2, 17.3, DIG. 8, DIG. 9, DIG. 23

[56] References Cited

U.S. PATENT DOCUMENTS

| | | | |
|---|---|---|---|
| 2,531,081 | 11/1950 | Shippey | 56/12.2 |
| 2,573,784 | 11/1951 | Asbury | 56/1 X |
| 3,636,939 | 1/1972 | Sijbring | 56/1 X |
| 3,899,866 | 8/1975 | Klier | |
| 3,959,954 | 6/1976 | Halsten | 56/12.8 |
| 5,231,827 | 8/1993 | Connolly et al. | 56/16.9 X |
| 5,263,304 | 11/1993 | Fassauer | 56/12.8 |
| 5,435,118 | 7/1995 | Cobile | 56/16.9 X |
| 5,526,636 | 6/1996 | Posch | 56/16.9 X |

FOREIGN PATENT DOCUMENTS 0 404 436 A1  12/1990  European Pat. Off. .
0 511 766 A2  11/1992  European Pat. Off. .

*Primary Examiner*—Heather Shackelford
*Attorney, Agent, or Firm*—Harness, Dickey & Pierce, P.L.C.

[57] ABSTRACT

Grass cutting machinery particularly suitable for mowing golf greens which are covered in early morning dew has an apparatus for preparing the grass in advance of the grass cutting blades. This relies on creating a flow of air around the dew covered grass to dislodge the dew from the grass. The flow of air can be effected by a blower, or suction.

7 Claims, 2 Drawing Sheets

GRASS CUTTING MACHINERY

BACKGROUND OF THE INVENTION

The present invention relates to grass cutting machinery, and to attachments for use with such machinery.

It is common knowledge that conventional lawn mowers cannot achieve a satisfactory cut of a lawn that is covered in dew. This is a particularly troublesome and inconvenient problem facing grounds men who are required to mow golf greens early in the morning, before the greens can dry out. Since wet greens cannot be mowed directly with conventional lawn mowers, a common approach is to manually wipe the moisture off the green using a very long flexible cane which is switched across the turf. This pre-mowing operation is of course hard work and time consuming, and makes cutting the greens a two-stage process.

It is therefore an object of the present invention to provide means for cutting dew covered grass, without requiring separate prior preparation of the grass.

Accordingly, the present invention provides grass cutting machinery comprising a grass cutting element and means for creating a flow of air to dislodge water droplets from grass, prior to cutting.

In one embodiment of the present invention, blower means creates the flow of air. Preferably, the blower means comprises nozzle means positioned in advance of the grass cutting element. In use, the blower means dislodges water droplets from grass by blowing the droplets off the grass.

In an alternative embodiment of the present invention, suction means creates the flow of air. Preferably, the suction means comprises nozzles means positioned in advance of the cutting element. In use the suction means dislodges water droplets by sucking the droplets off the grass.

BRIEF DESCRIPTION OF THE DRAWINGS

The invention will now be described with reference to the following diagrams in which.

DETAILED DESCRIPTION OF THE INVENTION

Figure 1:
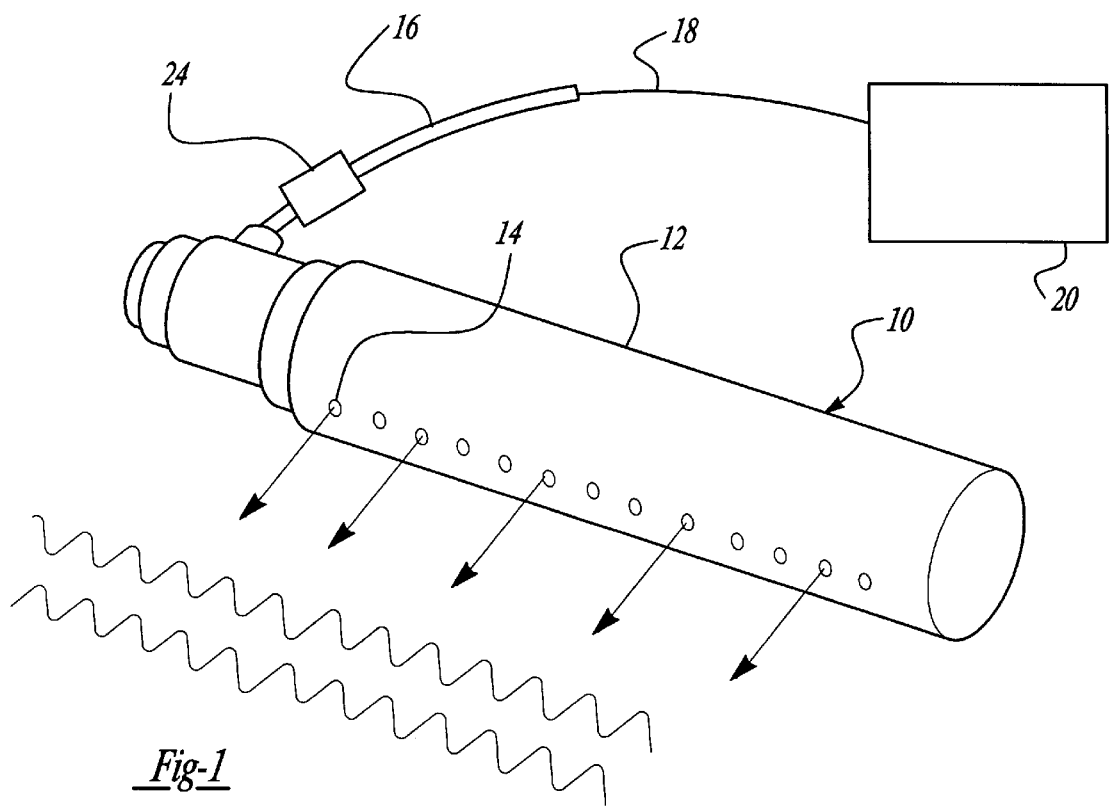
FIG. 1 illustrates apparatus according to a first embodiment of the present invention.

FIG. 1 shows the various components of one embodiment of the present invention: blower means 10 comprising a manifold 12, having an array of holes 14 pierced along its length, each hole forming a small nozzle. The manifold 12 receives a supply of pressurised air 18 through a hose 16 connected to one of its ends, while the other end is closed. The pressurised air 18 is provided by a compressor 20, and is forced down the hose 16 and into the manifold 12, where it exits from the holes 14 as a series of jets, denoted by the arrows 13 in FIG. 1. These jets are directed at the dew covered grass and results in the dew being dislodged and blown off the grass 22. In a variation of the air supply means, FIG. 1 also shows, schematically, a venturi 24 incorporated into the air supply apparatus, which in use draws air in and thus increases the total flow of air fed through the blower means 10.

Figure 2:
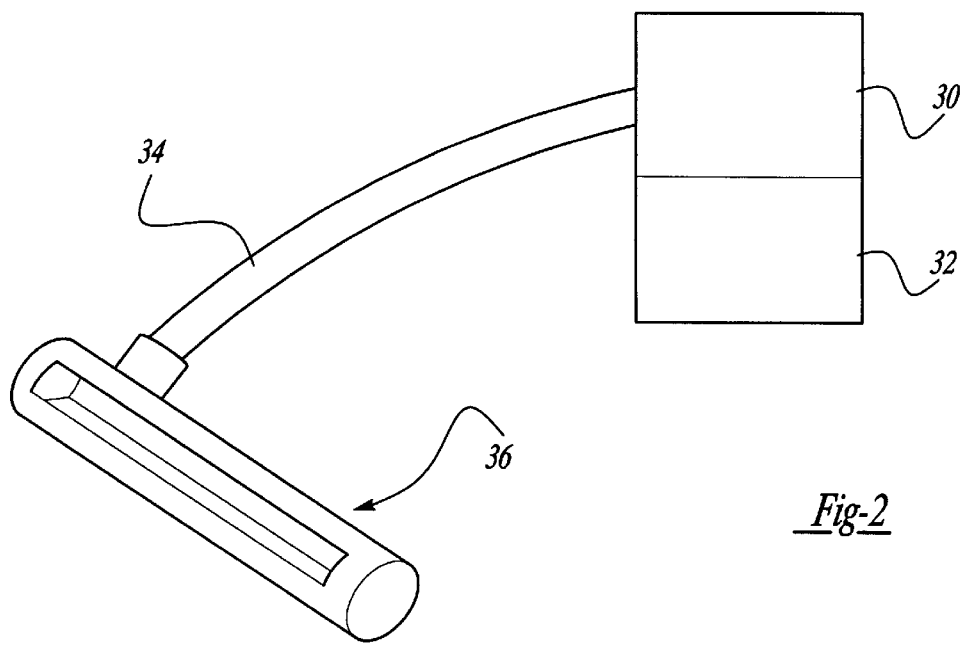
FIG. 2 illustrates apparatus according to a second embodiment of the present invention.

FIG. 2 shows the components of the apparatus according to a second embodiment of the present invention: there is provided means for generating a vacuum 30, a tank for containing collected dew 32, a connecting pipe 34 and a nozzle 36. In operation, the means for generating a vacuum 30 sucks the air from the connecting pipe 34 and the nozzle 36, the water droplets on the grass are consequently sucked up through the nozzle 36 and connecting pipe 34 and are deposited into the collecting tank 32.

In a modification of the second embodiment, the dew that is sucked from the grass, instead of being collected in the tank, is released directly into the atmosphere away from the grass to be cut, preferably being discharged behind the cutting machinery.

Figure 3:
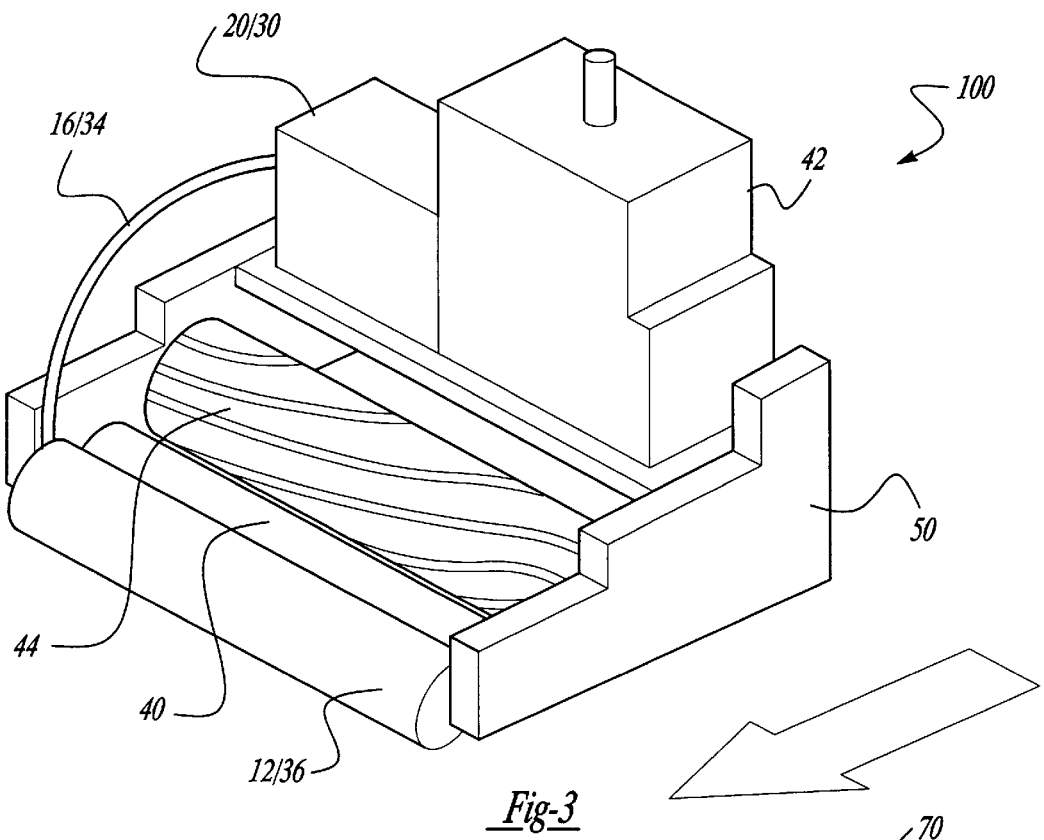
FIG. 3 shows a schematic representation of a lawn mower incorporating apparatus according to the present invention.

Turning to FIG. 3, apparatus of the first embodiment of this invention is shown fitted onto a conventional grass cutting unit 100. This, with one or more other units, is suitably supported in a grass cutting machine. The blower means 10 is mounted on the machine chassis 50 alongside a roller 40, with their respective axes parallel. FIG. 3 shows the manifold 12 positioned in front of the roller 40, however it could also be positioned between the roller 40 and the cutting cylinder 44. The compressor 20 is located next to, and coupled with, an engine 42, which drives the cutting cylinder 44. In operation, as the grass unit is moved in the direction of the arrow, the compressor 20 supplies pressurised air to the blower means, which directs air jets onto the wet grass causing the dew to be blown off, thus preparing the grass for the cutting cylinder 44 to cut. The arrangement of the apparatus of the second embodiment with the grass cutting unit is very similar to the arrangement of the apparatus of the first embodiment with the grass cutting unit.

Figure 4:
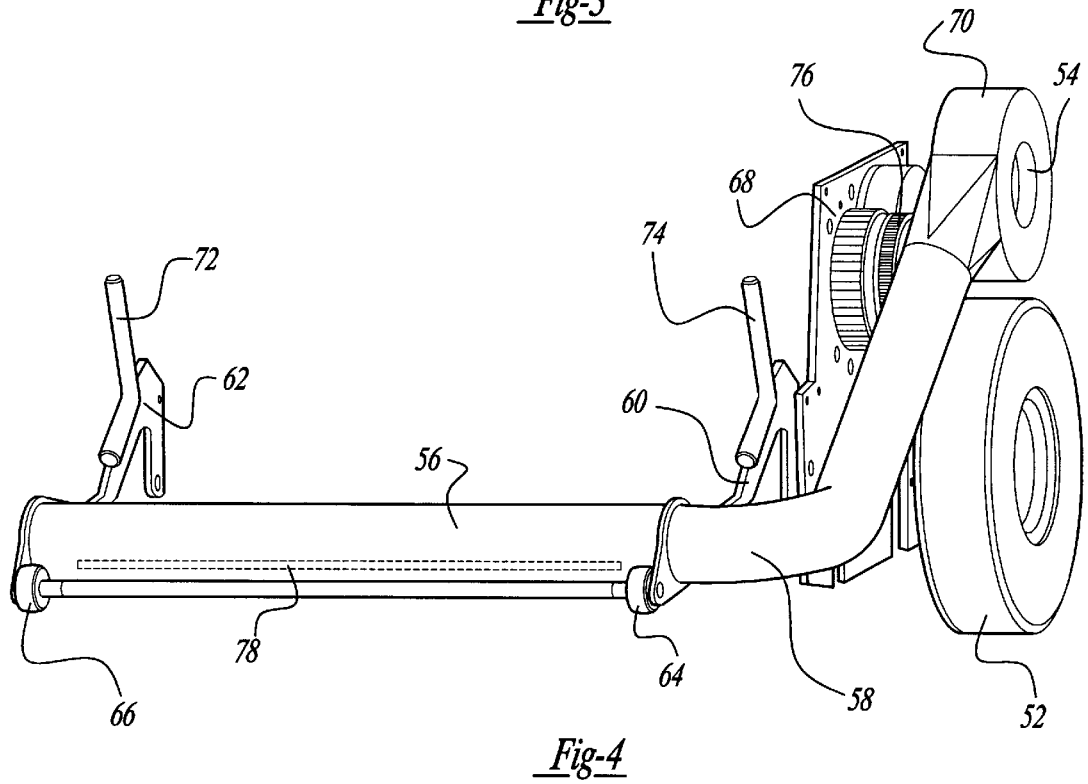
FIG. 4 shows a preferred embodiment according to the invention.

In FIG. 4, apparatus of the preferred embodiment is shown in assembled form but with the conventional components of the grass cutting machine largely omitted for the sake of clarity. A wheel 52 of the grass cutting machine is shown to give some idea of the position of the apparatus with respect to the roller 40 and cutting cylinder 44 (not shown). In this preferred embodiment the apparatus comprises a radial fan 54 for providing air flow through the apparatus, mounted on a frame plate 68. An output of the radial fan 54 is connected to an air intake end of a distribution manifold 56 through an angled duct 58. A first manifold bracket 60 supports the manifold at its intake end and a second manifold bracket 62 supports the manifold at a sealed end. The distribution manifold 56 has an aperture 78 comprising a slot along its length (shown by the dotted line) for output of the air. To adjust the direction of the air flow from the aperture 78 the manifold 56 may be axially rotated.

The first and second manifold brackets 60,62 are connected directly to or via a respective adjustable bracket (not shown) to the front of the grass cutting machine. The brackets 60,62 position the distribution manifold 56 in front of the roller 40.

The position of the manifold in the apparatus can be varied for optimum performance by means of the adjustable brackets. This is achieved by changing the height of the manifold 56 above ground level.

Each mounting 60,62 comprises an extension which supports a respective ground roller 64,66. The rollers 64,66, guide the manifold 56 over terrain and reduce the chances of the manifold grounding.

The radial fan 54 is belt driven from a lay shaft pulley 76 connected to a lay shaft on the grass cutter (not shown). A housing 70 surrounding the fan 54, includes an air intake opening at the side covered by a grill (not shown).

The air duct 58 comprises a straight section leading to a bend section, the bend section may be a concertina section (not shown) to provide flexibility in the apparatus.

A grass box mounting bracket 72,74 may be attached to each manifold bracket (62,60) so that the grass cutting box may be positioned above the manifold. Alternatively the grass cutting box is mounted directly on the grass cutter.

It will be readily understood by those skilled in the art that the principles of the present invention could be applied in a variety of different ways without departing from the scope of the invention. For instance, in one modification the slot 78 in the manifold would be replaced by a series of air jets emerging from the nozzles as long as a constant stream of air is provided under sufficient pressure to dislodge the dew from the grass.

I claim:

1. Grass cutting apparatus for cutting wet grass, comprising:
   - a horizontally-extending grass cutting element;
   - a fan which provides an ambient air flow through at least one nozzle, wherein said at least one nozzle directs air flow away from the cutting element in front of the grass cutting element to blow water from the grass prior to cutting.

2. Apparatus according to claim 1 further comprising a manifold having a plurality of apertures serving as said at least one nozzle.

3. Apparatus according to claim 1 wherein the grass cutting element is a cylindrical grass cutter.

4. Grass cutting apparatus for cutting wet grass, comprising:
   - a horizontally extending grass cutting element; and
   - at least one nozzle positioned in front of the cutting element; and
   - a fan which creates by suction a flow of ambient air though the nozzle to dislodge and remove water droplets from the grass in front of the cutting element prior to cutting, so that the grass is cut and passes from the cutting element in a relatively dry state.

5. Apparatus according to claim 1 wherein the nozzle directs the air flow substantially horizontally.

6. Apparatus according to claim 4 comprising a manifold having a plurality of apertures serving as said at least one nozzle.

7. Apparatus according to claim 4 wherein the grass cutting element is a cylindrical grass cutter.

* * * * *